(12) United States Patent
Bartley et al.

(10) Patent No.: US 8,716,396 B2
(45) Date of Patent: *May 6, 2014

(54) NONFLUORINATED POLYURETHANES AND METHODS OF MAKING AND USING THEREOF

(71) Applicants: James R. Bartley, Dalton, GA (US); Vance W. Brown, Dalton, GA (US); James K. Calhoun, Jr., Dalton, GA (US); Charles D. Cofield, Dalton, GA (US); John R. I. Eubanks, Dalton, GA (US)

(72) Inventors: James R. Bartley, Dalton, GA (US); Vance W. Brown, Dalton, GA (US); James K. Calhoun, Jr., Dalton, GA (US); Charles D. Cofield, Dalton, GA (US); John R. I. Eubanks, Dalton, GA (US)

(73) Assignee: Arrowstar LLC, Dalton, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/762,615

(22) Filed: Feb. 8, 2013

(65) Prior Publication Data

US 2013/0281614 A1  Oct. 24, 2013

Related U.S. Application Data

(63) Continuation-in-part of application No. 13/551,008, filed on Jul. 17, 2012.

(60) Provisional application No. 61/635,396, filed on Apr. 19, 2012.

(51) Int. Cl.
*C08G 71/04* (2006.01)

(52) U.S. Cl.
USPC ............................................ 524/588; 528/26

(58) Field of Classification Search
CPC ...................................................... C08G 71/04
See application file for complete search history.

(56) References Cited

U.S. PATENT DOCUMENTS

| | | | |
|---|---|---|---|
| 2,893,898 A * | 7/1959 | Meals et al. | ............ 427/387 |
| 3,246,048 A | 4/1966 | Haluska | |
| 3,388,101 A | 6/1968 | Wismer | |
| 4,130,708 A | 12/1978 | Friedlander et al. | |
| 4,369,300 A | 1/1983 | Carter et al. | |
| 4,464,431 A | 8/1984 | Hisaki et al. | |
| 4,590,224 A | 5/1986 | Frisch | |
| 4,617,340 A | 10/1986 | Tanaka et al. | |
| 4,631,329 A | 12/1986 | Gornowicz et al. | |
| 4,647,643 A | 3/1987 | Zdrahala et al. | |
| 4,902,767 A | 2/1990 | Roitman et al. | |
| 4,916,199 A | 4/1990 | Bandlish et al. | |
| 4,983,666 A | 1/1991 | Zavatteri et al. | |
| 5,208,313 A | 5/1993 | Krishnan | |
| 5,238,732 A | 8/1993 | Krishnan | |
| 5,239,036 A | 8/1993 | Krishnan | |
| 5,643,581 A * | 7/1997 | Mougin et al. | ............. 424/401 |
| 5,760,155 A | 6/1998 | Mowrer et al. | |
| 6,340,726 B1 | 1/2002 | Murray et al. | |
| 6,531,228 B1 | 3/2003 | Barelink et al. | |
| 6,593,417 B1 | 7/2003 | Anderson et al. | |
| 6,613,859 B2 | 9/2003 | Shores | |
| 6,794,445 B2 | 9/2004 | Reusmann et al. | |
| 7,078,026 B2 * | 7/2006 | Ferrari et al. | ............. 424/78.02 |
| 7,452,956 B2 | 11/2008 | Cheng et al. | |
| 8,057,693 B1 | 11/2011 | Ford et al. | |
| 8,063,113 B2 | 11/2011 | Dai et al. | |
| 2010/0298455 A1 | 11/2010 | Henning et al. | |
| 2012/0041141 A1 | 2/2012 | Otomo et al. | |
| 2012/0070647 A1 | 3/2012 | O'Neill | |

OTHER PUBLICATIONS

International Search Report dated Sep. 28, 2012 for international application No. PCT/US12/47030.
Office Action dated Oct. 26, 2012 for U.S. Appl. No. 13/551,008.
Office Action dated Jan. 28, 2013 for U.S. Appl. No. 13/551,008.

* cited by examiner

*Primary Examiner* — Randy Gulakowski
*Assistant Examiner* — Jeffrey Washville
(74) *Attorney, Agent, or Firm* — Gardner, Groff, Greenwald & Villanueva, P.C.

(57) ABSTRACT

Described herein are nonfluorinated polyurethanes having (a) a plurality of silicon polyol units and (b) a plurality of organic polyol units, wherein at least one of the organic polyol units has an ionizable group, and wherein the nonfluorinated polyurethanes are terminated by amino groups. The polyurethanes can be applied to a variety of different articles. The polyurethanes can impart a number of beneficial properties to an article including, but not limited to, liquid repellency, stain resistance, and bleach resistance. The nonfluorinated polyurethanes described herein are as effective or perform substantially better than fluorinated compounds currently used in the market. Methods for making the nonfluorinated polyurethanes are also described herein.

27 Claims, No Drawings

NONFLUORINATED POLYURETHANES AND METHODS OF MAKING AND USING THEREOF

CROSS REFERENCE TO RELATED APPLICATIONS

This application is a continuation-in-part of application Ser. No. 13/551,008 filed Jul. 17, 2012, which claims priority upon U.S. provisional application Ser. No. 61/635,396, filed Apr. 19, 2012. Each patent application identified above is hereby incorporated by reference in its entirety for all of its teachings.

BACKGROUND

The use of fluorinated compounds such as perfluorinated acrylates and fluorinated polyurethanes is known for imparting soil resistance and liquid repellency to substrates such as carpet, textiles, and the like. Although fluorinated compounds do impart beneficial properties, they present environmental concerns. Perfluorocarboxylic acids (PFOAs) have been found to be biopersistent and have the potential to cause ecological harm as well as be detrimental to human health. In 2006, the EPA instituted the "2010/15 PFOA Stewardship Program" in an attempt to eliminate emissions and product content of PFOAs by 2015. Thus, it would be desirable to have an alternative to fluorinated compounds that perform equal to or better than these compounds. As demonstrated below, the polyurethanes described herein are as effective or perform substantially better than fluorinated compounds currently used in the market.

SUMMARY

Described herein are nonfluorinated polyurethanes having (a) a plurality of siloxane units and (b) a plurality of organic polyoxy units, wherein at least one of the organic polyoxy units has an ionizable group, and wherein the polyurethanes are terminated by amino groups. The polyurethanes can be applied to a variety of different articles. The polyurethanes can impart a number of beneficial properties to the article including, but not limited to, liquid repellency, stain resistance, and bleach resistance. Methods for making the polyurethanes are also described herein.

Additional advantages of the compositions, methods, and articles described herein will be set forth in part in the description that follows, and in part will be apparent from the description. The advantages of the compositions, methods, and articles described herein will be realized and attained by means of the elements and combination particularly pointed out in the appended claims. It is to be understood that both the foregoing general description and the following detailed description are exemplary and explanatory only and are not restrictive of the compositions, methods, and articles described herein, as claimed.

DETAILED DESCRIPTION

The compositions, methods, and articles described herein can be understood more readily by reference to the following detailed description. It is also to be understood that the terminology used herein is for the purpose of describing particular to aspects only and is not intended to be limiting.

It must be noted that, as used in the specification and the appended claims, the singular forms "a," "an" and "the" include plural referents unless the context clearly dictates otherwise. Thus, for example, reference to "a wax" includes mixtures of two or more waxes.

The term "alkyl" refers to, unless stated otherwise, straight or branched hydrocarbon radicals, such as methyl, ethyl, propyl, butyl, octyl, isopropyl, tert-butyl, sec-pentyl, and the like. Alkyl groups can either be unsubstituted or substituted with one or more substituents, e.g., halogen, alkoxy, aryl, arylalkyl, aralkoxy and the like. Alkyl groups include, for example, 1 to 25 carbon atoms, 1 to 8 carbon atoms, or 1 to 4 carbon atoms.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulfur, or phosphorus.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "liquid repellency" is defined herein as the ability of an article to avoid penetration of a liquid into the article. The liquid can include water, solvents, or hydrophobic (i.e., oil-based) materials. For example, the nonfluorinated polyurethanes described herein enhance the water- and/or oil repellency of a substrate compared to the same substrate not treated with the nonfluorinated polyurethane.

The term "stain resistance" is defined herein as the ability of an article to resist to staining by any means. For example, the articles coated with the compositions described herein can be resistant to stains formed by any material or compound that contains a colorant. Examples of colorants include, but are not limited to, cationic dyes present in, for example, fruit juices, which can react with the article and permanently color or stain the article. The term "stain resistance" also includes the ability of the compositions described herein to help maintain the color of the coated article over time. The term "stain resistance" also includes the term soil resistance. The term "soil resistance" is defined herein as the ability of an article to resist soiling by a substance. Substances that can soil an article include, but are not limited to, solid particles such as, for example, fly ash, grass, clay, or other inorganic particulates; liquids such as, for example, oils and greases; mixtures of solids and liquids such as, for example, soot that contain particles mixed with oily components; and biological matter such as skin cells and sebum. Not wishing to be bound by theory, it is believed that the liquid repellent properties of the compositions described herein are one reason why the compositions described herein impart soil resistant properties to an article. Thus, the compositions described herein prevent or reduce the ability of a soiling substance to stick or adhere to the surface of an article.

The term "bleach resistance" is defined herein as the ability of an article to resist the detrimental effects (e.g., loss of color) when the article is contacted with chlorine bleach or cleaners and sanitizers that contain chlorine bleach. Not wishing to be bound by theory, it is believed that the liquid repellent properties of the compositions described herein can impart bleach resistant properties to the article. Thus, the compositions described herein prevent or reduce the ability of chlorine bleach to adversely affect the color of the article.

Durability is defined herein as the ability of the treated article to maintain its performance characteristics after repeated hot water extractions as performed in accordance with AATCC Hot Water Extraction, Method 171-2010.

Disclosed are materials and components that can be used for, can be used in conjunction with, can be used in preparation for, or are products of the disclosed compositions and methods. These and other materials are disclosed herein, and it is understood that when combinations, subsets, interactions, groups, etc. of these materials are disclosed that while specific reference of each various individual and collective combination and permutation of these compounds may not be explicitly disclosed, each is specifically contemplated and described herein. For example, if a diisocyanate is disclosed and discussed and a number of different silicon polyols are discussed, each and every combination and permutation of diisocyanate and silicon polyol that are possible are specifically contemplated unless specifically indicated to the contrary. For example, if a class of molecules A, B, and C are disclosed as well as a class of molecules D, E, and F and an example of a combination molecule, A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

Throughout this application, where publications are referenced, the disclosures of these publications in their entireties are hereby incorporated by reference into this application in order to more fully describe the state of the art to which this invention pertains.

I. Preparation of Nonfluorinated Polyurethanes

Described herein are nonfluorinated polyurethanes having (a) a plurality of siloxane units and (b) a plurality of organic polyoxy units, wherein at least one of the organic polyoxy units has an ionizable group, and wherein the polyurethanes are terminated by amino groups. The term "nonfluorinated polyurethane" as used herein is a polyurethane produced by the methods described herein wherein the polyurethane possesses no fluorine atoms. Each component used to make the polyurethanes and conditions for making the same are described in detail below.

In one aspect, the nonfluorinated polyurethane is produced by the process of (a) reacting a silicon polyol with a molar excess of first polyisocyanate to produce a first mixture comprising (i) a prepolymer comprising at least one isocyanate group and (ii) unreacted first polyisocyanate; (b) reacting the first mixture with one or more organic polyols to produce a second mixture, wherein at least one organic polyol has an ionizable group; and (c) terminating the reaction after step (b) with water to produce the nonfluorinated polyurethane composition. The first polyisocyanate is defined herein as any compound possessing two or more isocyanate groups. The first polyisocyanate can be a single compound or two or more different polyisocyanates.

In one aspect, the first polyisocyanate is an aliphatic diisocyanate, a cycloaliphatic diisocyanate, an aromatic diisocyanate, and isomers thereof. In another aspect, the first polyisocyanate is 2,4-toluenediisocyanate alone or in combination with an isomer thereof, 4,4'-diphenyl-methane-diisocyanate, 4,4'-methylenebis(cyclohexylisocyanate) (H12-MDI), 1-isocyanato-3-isocyanato-methyl-3,5,5-trimethylcyclohexane (isophorone diisocyanate), 2,4,4-trimethylhexamethylenediisocyanate, ethylidenediisocyanate, butylenediisocyanate, hexamethylenediisocyanate, cyclohexylene-1,4-diisocyanate, cyclohexylene-1,2-diisocyanate, xylylene diisocyanate, dichlorohexamethylene diisocyanate, dicyclohexyl-4,4'-diisocyanate, 1-methyl-2,4-diisocyanato-cyclohexane, 1-methyl-2,6-diisocyanato-cyclohexane, naphthalene-1,5-diisocyanate, p-phenylendiisocyanate, tetramethyl-xylylenediisocyanate (TMXDI), or any combination thereof. The first polyisocyanate can exist as one or more structural isomers. For example, the polyisocyanate can be a dimer, trimer or oligomer. In other aspects, the first polyisocyanate can exist as one or more positional isomers. For example, the polyisocyanate can be a mixture of 2,4-toluenediisocyanate and 3,4-toluenediisocyanate.

The silicon polyol useful herein is any compound possessing at least one silicon atom and at least two hydroxyl groups. In one aspect, the silicon polyol has the formula VI

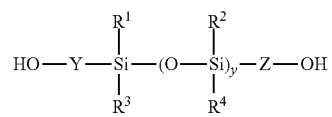

VI wherein y has a value of about 1 to 100, and $R^1$ to $R^4$ are, independently, selected from the group consisting of an alkyl group, a cycloalkyl group, or an aromatic group, and wherein the alkyl group, cycloalkyl group, or aromatic group can be substituted or unsubstituted; and Y and Z are, independently, an alkyl group, a cycloalkyl group, or an aromatic, and wherein the alkyl group, cycloalkyl group, or aromatic group can be substituted or unsubstituted. In one aspect, Y and Z are propyl groups.

In another aspect, the silicon polyol has the formula IV

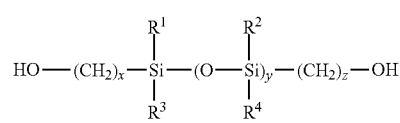

IV wherein x and z have a value of 0 to 10; y has a value of about 1 to 100, and $R^1$ to $R^4$ are, independently, selected from the group consisting of an alkyl group, a cycloalkyl group, or an aromatic group, and wherein the alkyl group, cycloalkyl group, or aromatic group can be substituted or unsubstituted.

In one aspect, y in formula IV is 2 to 50, 5 to 25, or 10 to 15. In another aspect, referring to formula IV, x and z are 3, $R^1$ to $R^4$ are methyl, and the silicon polyol has a molecular weight of from 500 to 7,500, 500 to 6,500, 500 to 5,000, 500 to 3,000, or 500 to 1,500. Thus, in certain aspects, the prepolymer has at least one siloxane unit having the formula I

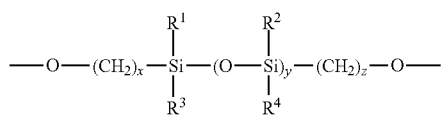

wherein x and z have a value of 0 to 10; y has a value of about 1 to 100, and $R^1$ to $R^4$ are, independently, selected from the group consisting of an alkyl group, a cycloalkyl group, or an aromatic group, and wherein the alkyl group, cycloalkyl group, or aromatic group can be substituted or unsubstituted. In another aspect, x is one and y is two in formulae I and IV. In another aspect, x and z are equal to 3 in formula I.

In other aspects, the silicon polyol (and the siloxane unit) can have additional functional groups. For example, the silicon polyol can have one or more additional isocyanate reactive groups such as, for example, substituted or unsubstituted amine groups. In other aspects, the silicon polyol can have one or more electrophilic groups that can react with a hydroxyl group (e.g., a hydroxyl group on the organic polyol).

The first polyisocyanate and silicon polyol can be admixed with one another in the appropriate solvent to ensure the silicon polyol reacts completely with the first polyisocyanate to produce the prepolymer. In one aspect, the solvent is an organic solvent that does not possess isocyanate-reactive groups (e.g., hydroxyl, amino, etc.). For example, ketones such as methylethyl ketone can be used as the solvent. In certain aspects, a catalyst can be used to facilitate the reaction between the first polyisocyanate and silicon prepolymer. For example, dibutyltindilaurate can be used as a catalyst. Other compounds such as tertiary amines and other organometallic compounds can be used as the catalyst. Additionally, the reaction mixture composed of the first polyisocyanate and silicon polyol can be heated in order ensure the reaction is complete. Non-limiting procedures for preparing the prepolymer are provided in the Examples.

The amount of first polyisocyanate relative to silicon polyol used to prepare the prepolymer can vary. In one aspect, the prepolymer is prepared by reacting the silicon polyol with a molar excess of the first polyisocyanate. By reacting the silicon polyol with an excess of first polyisocyanate, the resultant prepolymer has at least two isocyanate groups. In one aspect, the molar ratio of first polyisocyanate to silicon polyol is from 1:1 to 10:1. In another aspect, the molar ratio of first polyisocyanate to silicon polyol is from 1:1 to 10:1, 2:1 to 9:1, 3:1 to 8:1, 3:1 to 6:1, 3:1 to 5:1, 3.5:1 to 4.5:1, or about 4:1. As will be discussed below, it is not necessary to remove the excess polyisocyanate after producing the prepolymer.

In some aspects, in the presence of an excess of isocyanate moieties to isocyanate-reactive groups, the prepolymer can be represented by the following generic structure:

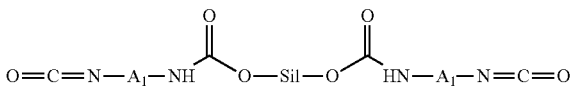

wherein "Sil" represents any siloxane unit as defined above for Formula I, and $A_1$ represents an alkyl group, a cycloalkyl group, an aromatic group, or isomers thereof.

After the prepolymer has been prepared, it is reacted with one or more organic polyols, wherein at least one organic polyol has an ionizable group. The term "organic polyol" includes any compound having at least two hydroxyl groups that does not contain any silicon or fluorine atoms. In certain aspects, the ionizable group on the organic polyol is an anionic ionizable group, a cationic ionizable group, or a combination thereof. The term "ionizable group" as used herein includes the neutral form of the group as well as the salt form of the group. For example, an anionic ionizable group includes a carboxylic acid (neutral) and the carboxylate salt thereof.

Cationic ionizable groups are functional groups that when protonated form a positively charged group. Examples of such groups include an amine or a salt thereof, where protonation of the amine produces a positively charged quaternary ammonium group. In one aspect, the organic polyol having a cationic ionizable group includes, but is not limited to, 3-dimethylamino-1,2-propandiol, 4-dimethylamino-1,2-butandiol, 3-diethylamino-1,2-propandiol, methyldiethanolamine, butyldiethanolamine, and methyldiisopropanolamine. In one aspect, the cationic ionizable group can be protonated by reacting the cationic ionizable group with an organic or inorganic acid such as, for example, hydrochloric, phosphoric, formic, acetic, lactic acid, or by reacting a substituted or unsubstituted amino group with nitrogen alkylation agent such as, for example, methyl iodide, dimethylsulfate, or benzyl bromide.

Conversely, anionic ionizable groups are groups that possess one or more hydrogen atoms that can be deprotonated to produce negatively charged groups. Examples of anionic ionizable groups include, but are not limited to, a carboxyl group, a sulfonic acid group, a phosphonic acid group, or a salt thereof. In one aspect, the anionic ionizable group can be deprotonated with a base such as, for example, ammonium hydroxide, sodium hydroxide, potassium hydroxide, lithium hydroxide, to calcium hydroxide, magnesium hydroxide, ferrous hydroxide, zinc hydroxide, copper hydroxide, aluminum hydroxide, ferric hydroxide, isopropylamine, trimethylamine, diethylamine, and triethylamine, or tripropylamine.

In one aspect, the organic polyol unit has the formula II

wherein A is an alkyl group, cycloalkyl group, or aromatic group, wherein the alkyl group, cycloalkyl group, or aromatic group can be substituted or unsubstituted, and wherein A has at least one ionizable group. In this aspect, the polyurethane contains at least one organic polyoxy unit having the formula —O-A-O—. In another aspect, the organic polyol has the formula V

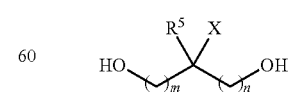

wherein m and n are, independently, from 0 to 10, $R^5$ is hydrogen or an alkyl group, and X is a carboxyl group. In this aspect, the polyurethane contains at least one organic polyoxy unit having the formula III

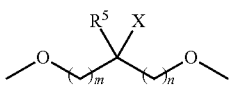

wherein m and n are, independently, from 0 to 10, $R^5$ is hydrogen or an alkyl group, and X is a carboxyl group. In one aspect, the organic polyol is dimethylolpropionic acid, dimethylolacetic acid, dimethylolbutyric acid, or the salt thereof.

Depending upon the selection of the organic polyol, it can be converted to the corresponding salt prior to reacting with the prepolymer. For example, the organic polyol having an anionic ionizable group can be treated with a base in order to produce the corresponding salt. In other aspects, the organic polyol can first be reacted with the prepolymer to produce the polyurethane, and the polyurethane can subsequently be treated with an acid or base depending upon the ionizable group that to is present to produce the corresponding salt. The degree of salt formation can vary depending upon the number of ionizable groups, the type and concentration of acid or base selected, and the degree of hydrophilicity that is desired.

In certain aspects, when an excess of first polyisocyanate is reacted with the silicon polyol, it is not necessary to remove the excess first polyisocyanate. Thus, the mixture of prepolymer and free first polyisocyanate is subsequently reacted with the organic polyol. Not wishing to be bound by theory, the hydroxyl groups present on the organic polyol react with the isocyanate groups present on the prepolymer to produce the polyurethane. The organic polyol can also react with the free first polyisocyanate to produce a second, new polyurethane in situ as well. Alternatively, the organic polyol can react with the prepolymer and free first polyisocyanate in order to chain extend the polyurethane. In certain aspects, an excess of first polyisocyanate relative to organic polyol is used to ensure that all of the organic polyol is consumed in the reaction. In one aspect, the molar ratio of first polyisocyanate prior to reaction with the silicon polyol to organic polyol is from 1:1 to 5:1, 1:1 to 3:1, 1.5:1 to 2.5:1, or about 2:1.

In some aspects, the second polyurethane formed when excess free isocyanate reacts with the organic polyol can be represented by the following generic structure:

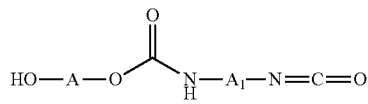

wherein $A_1$ represents an alkyl group, a cycloalkyl group, an aromatic group, or isomers thereof and A represents any group defined in Formula II above.

In other aspects, the second polyurethane formed from the organic polyol and excess first polyisocyanate can further react with the siloxane-containing prepolymer to produce an isocyanate-terminated polyurethane consistent with the following generic structure:

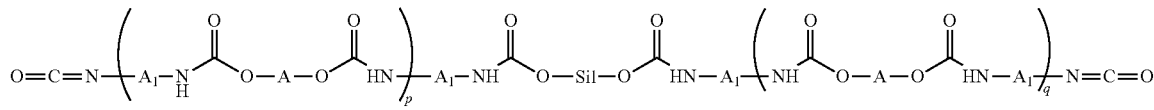

wherein "Sil" represents any siloxane unit as defined above for Formula I; $A_1$ represents an alkyl group, a cycloalkyl group, an aromatic group, or isomers thereof; A represents any group defined above for Formula II; and the values of p and q are determined based on the ratio of free isocyanate groups to free isocyanate-reactive groups present in the reaction mixture when the solution comprising the prepolymer and excess first isocyanate is contacted with the organic polyol. In some aspects, p and/or q are equal to 0 and in other aspects, either p or q or both are greater than 0.

The organic polyol can be added neat or as a solution to a solution of the prepolymer. The selection of the solvent can vary; however, organic solvents that do not possess isocyanate-reactive groups are preferred. In certain aspects, the organic polyol and prepolymer (with or without free first polyisocyanate) are dissolved in the same solvent. For example, the organic polyol and prepolymer can be dissolved in methylethyl ketone. The selection of the solvent can vary depending upon the solubilities of the organic polyol and prepolymer.

After the organic polyol and prepolymer have reacted for a sufficient time to produce the polyurethane, the reaction mixture is dispersed in water. In this step, free polyisocyanate and isocyanate groups (1 in scheme below) present on the polyurethane are converted to carbamic acid groups (2), which decarboxylate to form the free amine (3) (i.e., an amino group or —$NH_2$ group). The reaction is not terminated with alcohols such as, for example, methanol, ethanol, and the like, as this produces polymers having inferior properties. This is demonstrated in the Examples below.

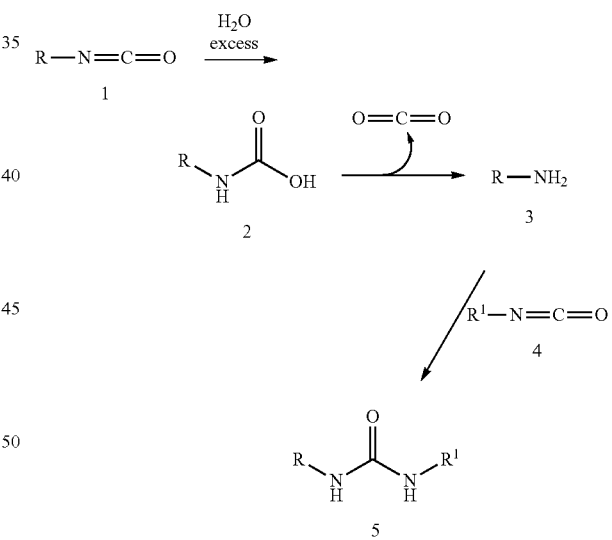

In certain aspects, the free amine can further react with any remaining free polyisocyanate and/or isocyanate groups (4) to produce urea linkages (5). Thus, the polyurethanes described herein can also possess one or more urea linkages.

In some aspects, when larger molar amounts of urea linkages are desired, the polyurethane can be dispersed in a relatively small molar amount of water. The amount of water required to achieve a desired number of urea linkages can be determined by a routine calculation. When all isocyanate groups have reacted to form free amino groups and/or urea linkages, the resultant polyurethanes described herein will have one or more terminal amino groups. In one aspect, the polyurethane will have 1 to 100 terminal amino groups. In another aspect, the polyurethane will have 1, 2, 3, 4, 5, 6, 7, 8, 9, 10, 15, 20, 25, 30, 35, 40, 45, 50, 55, 60, 65, 70, 75, 80, 85, 90, 95, 100 terminal amino groups, where any value can form a lower or upper end-point of a range. The reaction mixture can be heated in order to enhance the reaction between the water or free amino groups and the free polyisocyanate and/or isocyanate groups. Exemplary procedures for reacting the organic polyol with the prepolymer and subsequent chain termination with water are provided in the Examples. After chain termination, any organic solvent can be substantially or completely removed. The final polyurethane product can then be diluted with water, an organic solvent, or a combination thereof to produce a final composition of polyurethane at a desired concentration. In one aspect, the organic solvent is mineral spirits.

In certain aspects, the compositions composed of the polyurethanes described herein can be combined with other components depending upon the application of the polyurethane. In one aspect, a composition composed of the polyurethane also includes a silsesquioxane. Not wishing to be bound by theory, the incorporation of the silsesquioxane in the polyurethane composition can add rigidity to higher molecular weight polyurethanes described herein. For example, when the polyurethane is applied to a building material or other rigid substrate, it may be desirable to include the use of the silsesquioxane with the polyurethane. In one aspect, the composition includes the polyurethane in the amount of 1 to 99% by weight of the composition and a silsesquioxane in the amount of 99% to 1% by weight of the composition.

The silsesquioxanes useful herein have the general formula R—SiO$_{3/2}$ and/or R—Si(OR')$_3$ with silanes of the formula Si(OR')$_4$ and/or R$_2$—Si(OR')$_2$, wherein R represents a substituted or unsubstituted alkyl group having 1 to 7 carbon atoms, and R' represents an alkyl group with 1 to 4 carbon atoms. The silsesquioxane polymers can be neutral or anionic. In one aspect, the silsesquioxanes disclosed in U.S. Pat. No. 4,781,844 (Kortmann, et al.), U.S. Pat. No. 4,351,736 (Steinberger et al.), U.S. Pat. No. 5,073,442 (Knowlton et al.) or U.S. Pat. No. 3,493,424 (Mohrlok et al.), each of which are incorporated herein by reference, can be used herein.

The silsesquioxane can be prepared by adding a silane to a mixture of water in the presence of a buffer and/or a surfactant, while agitating the mixture under acidic or basic conditions. Depending upon the selection of the silane, alcohol produced during the production of the silsesquioxane can be removed by techniques known in the art such as, for example, distillation. In one aspect, silanes useful in making the silsesquioxane include, but are not limited to, methyltrimethoxysilane, methyltriethoxysilane, methyltriisopropoxyoxysilane, ethyltrimethoxysilane, ethyltriethoxysilane, propyltrimethoxysilane, isobutyltrimethoxysilane, isobutyltriethoxysilane, 2-ethylbutyltriethoxysilane, tetraethoxysilane, and 2-ethylbutoxytriethoxysilane. The amount of silsesquioxane used in the compositions described herein can vary, which will be described in detail below.

In another aspect, a composition composed of the polyurethane also includes a wax. Not wishing to be bound by theory, the incorporation of the wax in the polyurethane composition can increase the feel of softness to lower molecular weight polyurethanes, which are more rigid. For example, when the polyurethane is applied to carpet or a textile, it may be desirable to include the wax with the polyurethane in order to achieve a softer feel when the polyurethane is applied to the article. In one aspect, the composition includes the polyurethane in the amount of 10% to 90% by weight of the composition, a wax, in the amount of 90% to 100% by weight of the composition, and water.

The wax component is not limited and known wax components can be used. Examples of waxes useful herein include, but are not limited to, vegetable waxes such to as carnauba wax, haze wax, ouricury wax and esparto wax; animal waxes such as bees wax, insect wax, shellac wax and spermaceti wax; petroleum waxes such as paraffin wax, micro crystal wax, polyethylene wax, ester wax and oxidized wax; mineral waxes such as montan wax, ozokerite and ceresine; modified wax, glyceride, synthetic ketone amine amide, hydrogenated wax, or any combination thereof.

In other aspects, the wax component is a higher fatty acid such as palmitic acid, stearic acid, margaric acid and behenic acid; higher alcohols such as palmityl alcohol, stearyl alcohol, behenyl alcohol, margaryl alcohol, myricyl alcohol and eicosanol; higher fatty acid esters such as cetyl palmitate, myricyl palmitate, cetyl stearate and myricyl stearate; amides such as acetamide, propionic acid amide, palmitic acid amide, stearic acid amide and amide wax; higher fatty amines such as stearylamine, behenylamine and palmitylamine, or any combination thereof.

In one aspect, the wax comprises paraffin wax, candelilla wax, and a polyoxyalkylene such as polyethylene oxide (e,g,. Carbowax 400).

In other aspects, the polyurethane compositions described herein can include one or more surfactants. In one aspect, the surfactant is anionic, cationic, or neutral. Useful anionic surfactants include, but are not limited to, alkali metal and (alkyl) ammonium salts of: 1) alkyl sulfates and sulfonates such as sodium dodecyl sulfate, sodium 2-ethylhexyl sulfate, and potassium dodecanesulfonate; 2) sulfates of polyethoxylated derivatives of straight or branched chain aliphatic alcohols and carboxylic acids; 3) alkylbenzene or alkylnaphthalene sulfonates and sulfates such as sodium laurylbenzene-4-sulfonate and ethoxylated and polyethoxylated alkyl and aralkyl alcohol carboxylates; 5) glycinates such as alkyl sarcosinates and alkyl glycinates; 6) sulfosuccinates including dialkyl sulfosuccinates; 7) isothionate derivatives; 8) N-acyltaurine derivatives such as sodium N methyl-N-oleyltaurate); 9) amine oxides including alkyl and alkylamidoalkyldialkylamine oxides; and 10) alkyl phosphate mono or di-esters such as ethoxylated dodecyl alcohol phosphate ester, sodium salt.

Representative commercial examples of suitable anionic sulfonate surfactants include, for example, sodium lauryl sulfate, available as TEXAPON™ L-100 from Henkel Inc., Wilmington, Del., or as POLYSTEP™ B-3 from Stepan Chemical Co, Northfield, Ill.; sodium 25 lauryl ether sulfate, available as POLYSTEP™ B-12 from Stepan Chemical Co., Northfield, Ill.; ammonium lauryl sulfate, available as STANDAPOL™ A from Henkel Inc., Wilmington, Del.; and sodium dodecyl benzene sulfonate, available as SIPONATE™ DS-10 from Rhone-Poulenc, Inc., Cranberry, N.J., dialkyl sulfosuccinates, having the trade name AEROSOL™ OT, commercially available from Cytec Industries, West Paterson, N.J.; sodium methyl taurate (available under the trade designation NIKKOL™ CMT30 from Nikko Chemicals Co., Tokyo, Japan); secondary alkane sulfonates such as Hostapur™ SAS which is a Sodium (C14-C17) secondary alkane sulfonates (alpha-olefin sulfonates) available from Clariant Corp., Charlotte, N.C.; methyl-2-sulfoalkyl esters such as sodium methyl-2-sulfo(C12-16)ester and disodium 2-sulfo(C12-C16) fatty acid available from Stepan Company under the trade designation ALPHASTE™ PC48; alkylsulfoacetates and alkylsulfosuccinates available as sodium laurylsulfoacetate (under the trade designation LANTHANOL™ LAL) and disodiumlaurethsulfosuccinate (STEPANMILD™ SL3), both from Stepan Company; alkylsulfates such as ammoniumlauryl sulfate commercially available under the trade designation STEPANOL™ AM from Stepan Company, and or dodecylbenzenesulfonic acid sold under BIO-SOFT® AS-100 from Stepan Chemical Co. In one aspect, the surfactant can be a disodium alpha olefin sulfonate, which contains a mixture of $C_{12}$ to $C_{16}$ sulfonates. In one aspect, CALSOFT™ AOS-40 manufactured by Pilot Corp. can be used herein as the surfactant. In another aspect, the surfactant is DOWFAX 2A1 or 2G manufactured by Dow Chemical, which are alkyl diphenyl oxide disulfonates.

Representative commercial examples of suitable anionic phosphate surfactants include a mixture of mono-, di- and tri-(alkyltetraglycolether)-o-phosphoric acid esters generally referred to as trilaureth-4-phosphate commercially available under the trade designation HOSTAPHAT™ 340KL from Clariant Corp., as well as PPG-5 cetyl 10 phosphate available under the trade designation CRODAPHOS™ SG from Croda Inc., Parsipanny, N.J.

Representative commercial examples of suitable anionic amine oxide surfactants those commercially available under the trade designations AMMONYX™ LO, LMDO, and CO, which are lauryldimethylamine oxide, to laurylamidopropyldimethylamine oxide, and cetyl amine oxide, all from Stepan Company.

In the case of nonionic surfactants, in one aspect, the nonionic surfactants include the condensation products of a higher aliphatic alcohol, such as a fatty alcohol, containing about 8 to about 20 carbon atoms, in a straight or branched chain configuration, condensed with about 3 to about 100 moles, preferably about 5 to about 40 moles, most preferably about 5 to about 20 moles of ethylene oxide. Examples of such nonionic ethoxylated fatty alcohol surfactants are the Tergitol™ 15-S series from Union Carbide and Brij™ surfactants from ICI. Tergitol™ 15-S Surfactants include $C_{11}$-$C_{15}$ secondary alcohol polyethyleneglycol ethers. Brij™ 97 surfactant is Polyoxyethylene(10) oleyl ether; Brij™ 58 surfactant is polyoxyethylene(20) cetyl ether; and Brij™ 76 surfactant is polyoxyethylene(10) stearyl ether.

Another useful class of nonionic surfactants include the polyethylene oxide condensates of one mole of alkyl phenol containing from about 6 to 12 carbon atoms in a straight or branched chain configuration, with about 3 to about 100 moles, preferably about 5 to about 40 moles, most preferably about 5 to about 20 moles of ethylene oxide to achieve the above defined HLB. Examples of nonreactive nonionic surfactants are the Igepal™ CO and CA series from Rhone-Poulenc. Igepal™CO surfactants include nonylphenoxy poly(ethyleneoxy)ethanols. Igepal™ CA surfactants include octylphenoxy poly(ethyleneoxy)ethanols.

Another useful class of hydrocarbon nonionic surfactants includes block copolymers of ethylene oxide and propylene oxide or butylene oxide with HLB values of about 6 to about 19, preferably about 9 to about 18, and most preferably about 10 to about 16. Examples of such nonionic block copolymer surfactants are the Pluronic™ and Tetronic™ series of surfactants from BASF. Pluronic™ surfactants include ethylene oxide-propylene oxide block copolymers. Tetronic™ surfactants include ethylene oxide-propylene oxide block copolymers.

In other aspects, the nonionic surfactants include sorbitan fatty acid esters, polyoxyethylene sorbitan fatty acid esters and polyoxyethylene stearates having HLBs of about 6 to about 19, about 9 to about 18, and about 10 to about 16. Examples of such fatty acid ester nonionic surfactants are the Span™, Tween™, and Myj™ surfactants from ICI. Span™ surfactants include $C_{12}$-$C_{18}$ sorbitan monoesters. Tween™ surfactants include poly(ethylene oxide) $C_{12}$-$C_{18}$ sorbitan monoesters. Myj™ surfactants include poly(ethylene oxide) stearates.

In one aspect, the nonionic surfactant can include polyoxyethylene alkyl ethers, polyoxyethylene alkyl-phenyl ethers, polyoxyethylene acyl esters, sorbitan fatty acid esters, polyoxyethylene alkylamines, polyoxyethylene alkylamides, polyoxyethylene lauryl ether, polyoxyethylene cetyl ether, polyoxyethylene stearyl ether, polyoxyethylene oleyl ether, polyoxyethylene octylphenyl ether, polyoxyethylene nonylphenyl ether, polyethylene glycol laurate, polyethylene glycol stearate, polyethylene glycol distearate, polyethylene glycol oleate, oxyethylene-oxypropylene block copolymer, sorbitan laurate, sorbitan stearate, sorbitan distearate, sorbitan oleate, sorbitan sesquioleate, sorbitan trioleate, polyoxyethylene sorbitan laurate, polyoxyethylene sorbitan stearate, polyoxyethylene sorbitan oleate, polyoxyethylene laurylamine, polyoxyethylene laurylamide, laurylamine acetate, hard beef tallow propylenediamine dioleate, ethoxylated tetramethyldecynediol, fluoroaliphatic polymeric ester, polyether-polysiloxane copolymer, and the like.

The compositions described herein can include other components such as, for example, preservatives or antimicrobial agents. As will be discussed below, separate compositions composed of the polyurethane with the silsesquioxane and/or wax can be prepared and stored for extended periods of time prior to mixing with the aid of preservatives and antimicrobial agents. In other aspects, the compositions can also include rheology modifiers and foaming agents.

Any of the components described above can be admixed with the polyurethane in water, an organic solvent, or a combination thereof. The term "admixing" is defined as the mixing of two or more components together so that there is no chemical reaction or physical interaction. The term "admixing" also includes the chemical reaction or physical interaction between any of the components described herein upon mixing to produce the composition.

In one aspect, the polyurethane compositions described herein can be used as kits. For example the polyurethane composition in water or another suitable solvent can be in a first container, and a second composition composed of a silsesquioxane, a wax, or a combination thereof can be in the second container. In this aspect, the compositions can be shipped to any site and mixed prior to being applied to the to article. In the alternative, the kits permit the sequential application of the first and second composition to the article. For example, the first composition (i.e., polyurethane) can be applied to the article first followed by the application of the second composition (i.e., silsesquioxane and/or wax). Alternatively, the second composition can be applied first followed by the application of the first composition. Finally, as discussed above, the polyurethane can be admixed with the silsesquioxane and/or wax and subsequently applied to the article.

II. Applications of Nonfluorinated Polyurethanes

The polyurethanes described herein can impart one or more desirable properties to an article. As demonstrated in the Examples, the polyurethanes described herein are as effective or perform substantially better than fluorinated compounds currently used in the market. For example, the polyurethanes described herein can impart liquid repellency, dry soil resistance, stain resistance, bleach resistance, or any combination thereof to an article.

Any of the polyurethane compositions described herein can be applied to an article or substrate using techniques known in the art. The method for contacting the article with the composition will vary depending upon the article and the form of the composition. In one aspect, the compositions described herein can be in the form of an aqueous medium or a dispersion, such as a foam. Alternatively, the compositions described herein can be dissolved or dispersed in an organic solvent such as, for example, a glycol or polyether, or an aqueous organic solvent. In this aspect, the composition can be applied to the article by spray application. In another aspect, other methods such as, for example, Beck application, Continuous Liquid and Foam application, Flood, Flex Nip, Pad, and Superba (saturated steam continuous heat setting) applications can be used to contact the article with the composition.

In another aspect, when the contacting step involves topical coating, the coating step can be performed by spray, foam, kiss or liquid injection methods and various methods thereof followed by drying in a hot air or radiant heat oven at 160 to 320° F. for a time sufficient to dry the article. In one aspect, a spray application can be applied in a liquid medium (water and chemical treatment) with a wet pickup of 5% to about 200% followed by drying. In another aspect, a foam application can be applied in a liquid medium (water and chemical treatment) with a wet pickup of 1% to about 200%. In another aspect, when the nonfluorinated polyurethane is applied to carpet fibers, the polyurethane can be from 0.1% to 5% owf, 0.5% to 3% owf, or 1% to 2.5% owf. In this aspect, the foam can be applied by a direct puddle application with a press roll, an injection manifold and/or a sub-surface extraction device. Subsequent drying in a hot air or radiant heat oven at 160 to 320° F. for a time sufficient to dry the article should follow.

In one aspect, the weight ratio of the polyurethane described herein can vary between 0.5% to 600% of wet pick up where such amount is based on the weight of the article and the composition that is used. The weight ratio will vary dependent on the manner of application. In one aspect, the owg ("on weight goods") amount of polyurethane applied to the fiber is 0.03% to 20% owg, 0.05% to 15% owg, or 0.1% to 10% owg, 0.25% to 5% owg, or 0.5% to 2.5% owg.

Application conditions such as pH, temperature, steam and drying time can vary. As would be recognized by one of ordinary skill in the art, the amount of pH adjustment needed prior to use of the compositions will depend on the amount of each component in the composition. Further, pH adjustment of the composition prior to use can be by methods known to one of ordinary skill in the art, such as the addition of acid or base, as appropriate. In one aspect, once the article has been contacted with the composition, the article can be further treated to remove any composition that is not bound to the article.

The temperature at which the article is contacted by the compositions described herein range from ambient to temperatures up to 100° C. at atmospheric pressure and above 100° C. under pressure conditions (closed atmosphere). Still further, the temperature of application can be from 25, 35, 45, 55, 65, 75, 85 or 100° C., where any value can form an upper or a lower end point, as appropriate. In another aspect, the composition can be cured at ambient temperature once applied to the substrate.

Where production procedures warrant, steam can aid in the efficacy of the compositions herein when applied by, but not limited to Beck, Continuous liquid, Flood, Flex Nip, Superba, and Pad applications. The steam time can vary from about 15 seconds to about 10 minutes, or from about 2 minutes to about 8 minutes. Still further, the application time can be from about 15 seconds or 1, 2, 3, 4, 5, 6, 7, 8, 9 or to 10 minutes, where any value can form an upper or a lower end point, as appropriate. In certain applications, but not limited to Spray Application and Foam Application, drying with forced heat can aid in the fixing of the composition to the article. In one aspect, the coated article can be dried with forced air. In another aspect, the coated article can be dried with microwave heat. The drying time is generally dependent upon varying conditions predicated by moisture content, range speed, type construction, the weight of the substrate, etc. The drying time can vary from 30 seconds to 15 minutes. Still further, the drying time can be from 15 seconds or 1, 3, 5, 7, 9, 10, 12, or 15 minutes, where any value can be used as an upper or lower endpoint, as appropriate.

In one aspect, the article coated with the polyurethane described herein can be composed of any material that can receive and that will adhere to the composition. The article can range from a soft, flexible material to a hard, rigid substrate. In one aspect, the article is a textile. Examples of textiles include, but are not limited to, bedding (e.g., blankets, sheets, pillowcases, futon or comforter covers, comforter wadding), clothes (e.g., suits, uniforms, shirts, blouses, trousers, skirts, sweaters, socks, panty hoses, shoe linings, shoe sole inserts), curtains, and carpet.

In one aspect, the textile is composed of natural and/or synthetic fibers. In one aspect, the synthetic fiber includes, but is not limited to, viscose fibers (e.g., rayon), acrylic fibers, polyamide fibers (e.g., nylons), polyester fibers (polyethylene terephthalate, polytrimethylene terephthalate), polypropylene fibers, synthetic fibers containing free amino groups, and derivatives thereof such as nylon covered with polypropylene. Fibers containing free amino groups can be obtained by a variety of methods, including, but not limited to, the condensation reaction of hexamethylenediamine with adipic acid, hexamethylenediamine with sebacic acid, ξ-aminodecanoic acid, caprolactam and dodecylcaprolactam. Fibers formed from polyaryl amides, including type 6 and type 6,6 nylons, can be treated by the compositions and methods described herein. Examples of natural fibers include, but are not limited to, cotton, wool, and flax. Semisynthetic fibers such as rayon can also be contacted with any of the compositions described herein. In one aspect, the fibers are Dupont's Antron®, Sorona® yarn manufactured by Dupont, and Cortena® (polytrimethylene terephthalate) manufactured by Shell Chemicals.

The fibers treated with the compositions and methods described herein can be twisted, woven, tufted and sewn into various forms of textile materials including, but not limited to, rugs, carpets, and yarns. The fibers can be treated and then formed into the various forms of textile materials, or the formed textile can be treated.

In another aspect, the polyurethanes described herein can be applied to paper-based packaging materials. In one aspect, the polyurethanes can be applied to paper-based articles used in the food industry such as, for example, cardboard boxes. An example of this is a pizza box, where it is desirable to increase the water repellency of the box, which makes the box more durable. In another aspect, the polyurethanes can be applied to sandwich wrappers used in the fast food industry in order to increase liquid repellency. In one aspect, the polyurethanes can also be applied to cardboard boxes used for storing materials such as clothing and the like. Once again, the polyurethanes can impart water repellency, which will ultimately protect the box and the contents within the box.

In other aspects, the article is a building material. Examples of building materials include, but are not limited to, a hardwood, an engineered wood flooring, a plasterboard, a plywood, a concrete, a mortar, tile, a fiber-blended cement board, a cement calcium silicate board, a slag cement perlite board, an ALC board, a siding board, an extruded board, a steel plate, a plastic plate, a shingle, bricks, stones, or grout. Depending upon the application, the polyurethane can be applied prior to installation or, in the alternative, can be applied to the building material after installation. In other aspects, the polyurethanes can be incorporated into a paint (oil- or water-based paints). Here, the polyurethanes can impart water repellency and stain resistance to an indoor and outdoor substrate that has been painted with the polyurethane-modified paint.

Examples

The following examples are put forth so as to provide those of ordinary skill in the art with a complete disclosure and description of how the compositions and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

A. Preparation of Nonfluorinated Polyurethanes

The components used to prepare two polyurethane compositions described herein (PU-1 and PU-2) are provided below:

PU-1
Isophorone Diisocyanate: 1.92 molar ratio
Carbinol endcapped Polydimethylsilicone Fluid (mw=1,000): 0.46 molar ratio
Dimethylolpropionic acid: 1.0 molar ratio
Triethylamine: 0.99 molar ratio
Methylethyl ketone (MEK): 17-18 weight %
Dibutyltindilaurate (DBTDL catalyst): 0.01 weight %
Water: 75 weight %

PU-2
Isophorone Diisocyanate: 2.92 molar ratio
Carbinol Endcapped Polydimethylsilicone Fluid (mw=1,000): 1.4 molar ratio
Dimethylolpropionic acid: 1.0 molar ratio
Triethylamine: 0.99 molar ratio
Methylethyl ketone (MEK): 4.5 weight %
Dibutyltindilaurate (DBTDL catalyst): 0.01 weight %
Isopropanol: 4 weight %
Water: 75 weight %

The following procedure was used to prepare PU-1 and PU-2.
1. The prepolymer was produced by the reaction between the polyisocyanate and the silicon polyol in an MEK solution catalyzed with DBTDL at 65° C. for 2 hours. The prepolymer solution was not processed further and was used as-is below.
2. Dimethylolpropionic acid was converted to the corresponding salt with triethylamine in MEK at 25° C. for 30 minutes. The solution of was used as-is without further processing.
3. To the solution of prepolymer, the solution of the salified dimethylolpropionic acid was added. The resulting mixture was held at 65° C. with stirring. After about 3 hours the NCO titre was determined according to ASTM D 2572 and it was observed that all the hydroxyl groups had reacted. Thus, the NCO titre corresponds to the theoretical titre.
4. The solution produced in step (3) was dispersed in water at 50° C. for 0.5 hours
5. MEK was removed under vacuum at 55° C. to less than 0.2 wt % and the solids were adjusted to 25 wt % with water.

B. Preparation of Carbamate-Terminated Nonfluorinated Polyurethanes

Nonfluorinated polyurethanes were prepared by the procedure described above for PU-1; however, the reactions were terminated with several different alcohols rather than with water. Alcohols tested included methanol, ethanol, 2-propanol, and isobutanol.

C. Preparation of Silsesquioxane Composition (ASA)

The components used to prepare the silsesquioxane composition are provided in Table 1. The following procedure was used to prepare the composition.
1. Charge dodecylbenzyl sulfuric acid (DDB SA) and water. Mix until DDB SA is dissolved.
2. Start a nitrogen blanket. Run on full for 30 seconds and then change to 1 scfm. Nitrogen should be present in tank at all times.
3. Charge solution with aqua ammonia.
4. For a 20,000 lb batch, methyl trimethoxy silane addition rate was 5 lb/min (2.5 lb/min at two different addition points).
5. Sample after each drum is charged to check turbidity. Appearance should be clear to clear blue.
6. After all silane is charged mix for 1 hour.
7. After charging silane, charge 5 gallons of methanol through pump and lines to clear out the silane.
8. Set up to receive methanol/water distillate. Begin heating to 97-99° C.
9. After temperature is reached sample every 2 hours for % solids. Solids should be 9-11%.
10. Once in-process solids are in spec begin cooling to less than 30° C.
11. Charge with preservative.
12. When 30° C. or below, sample to lab for pH adjustment with ammonia. (pH=6.5-7.5).
13. Drum product through 5 micron filter bag.

TABLE 1

| COMPONENT | % |
| --- | --- |
| Water | 86.365% |
| DDBSA | 0.635% |
| Methyl trimethoxysilane | 12.700% |
| Water/Methanol Distillate | −24.000% |
| Aqua Ammonia | 0.200% |
| Preservative | 0.100% |

D. Preparation of Wax Composition (WR)

The components used to prepare the wax composition are provided in Table 2. The following procedure was used to prepare the composition.
1. Charge paraffin wax and heat to melt (around 91° C.).
2. Add in increments, candelilla wax to the melt. Allow the wax to melt while adding, then agitate the wax.
3. Add oleic acid and adjust temperature to 91-92° C.

4. To a second kettle, charge water, Tauranol MS, Triethanolamine. Heat to 91-92° C.
5. With both kettles at a temperature of 91-92° C., charge the water mix to the wax melt slowly and with good agitation. Maintain a temperature of 91-92° C.
6. After addition is complete, hold at 91-92° C. for 15 minutes.
7. Homogenize into cooling kettle containing water and Carbowax 400. Homogenize at 1000 psi 2nd stage and 3000 psi 1st stage. Apply cooling on receiver prior to beginning homogenization. Agitation should be applied soon on the receiver in order to minimize splash and foaming. Leave agitation on coarse emulsion. Maintain coarse emulsion at 91-92° C. After homogenization, dump any unhomogenized product from incoming line and homogenizer. Blow any product from the output line into the receiver.
8. Cool wax composition to 32° C.

TABLE 2

| COMPONENTS | % |
|---|---|
| PARAFFIN WAX | 14.21 |
| CANDELILLA WAX | 5.29 |
| OLEIC ACID | 2.27 |
| WATER | 37.27 |
| TAURANOL MS | 1.09 |
| TRIETHANOLAMINE | 2.35 |
| WATER | 37.27 |
| CARBOWAX 400 | 0.25 |

E. Preparation of Compositions Composed of Nonfluorinated Polyurethanes with Silsesquioxane or Wax A mixing tank was filled with a specific amount of water. Next the nonfluorinated polyurethane was added to the tank followed by the addition of the silsesquioxane (B) or wax (C). Alternatively, the silsesquioxane (B) or wax (C) can be added first followed by the addition of the nonfluorinated polyurethane. The composition is then mixed at room temperature to produce a uniform dispersion.

F. Evaluation of Nonfluorinated Polyurethanes

The test compositions were applied topically onto carpets made of nylon 6. Application amounts range from 0.5% owf to 1.5% owf of the polyurethane, silsesquioxane, and wax. The following test methods were used in the evaluation below:
Flammability Test: ASTM 2859-96 (Pill test)
Water Repellency: 3M Water Repellency test
Soiling: AATCC Method 123-2000
Durability: AATCC Hot Water Extraction, Method 171-2010
Stain Resistance: AATCC Red Dye 40, Method 175-1991
Bleach Rating: AATCC Gray Scale for Evaluating Change in Color ISO Standard 105/A02

Below are the results when a water-based composition composed of 1% owf of PU-1 and 1% owf wax (WR) was applied to the nylon fibers.
Burn Test: Pass 8 of 8
Soiling: Excellent
Durability: 10 extractions, water repellency unchanged
Stain Resistance: 7, control (untreated)=1, where higher value is better
Bleach Resistance: 2.5, control (untreated)=1, where higher value is better In summary, compositions composed of PU-1 and WR enhanced several properties of the fibers.

Next, the water repellency of several compositions was evaluated when applied to the nylon fiber, and the results are shown below.

1% owf PU-1/1% owf WR=2+ hours
1% owf ASA/1% owf WR=45 minutes
1% owf Arroshield SR (fluoro from ArrowStar LLC)=10 minutes
1% owf PU-1=2+ hours
2% owf PU-1=4+ hours
1% owf PU-2=1 hour
2% owf PU-2=4+ hours
1% owf PU-2/0.5% owf ASA=2+ hours In summary, the nonfluorinated polyurethanes alone or in combination with WR or ASA are effective in repelling water when compared to ASA/WR and SR.

Water repellency was further evaluated on kraft paper, where paper treated with 1% owg PU-1 repelled water for 4+ hours, whereas the commercially-available kraft paper that is composed of the same paper above and pre-treated with a wax only repelled water for only 20 seconds.

Finally, the nonfluorinated polyurethanes with WR and ASA were evaluated against (1) C6: Unidyne TG-2211, Daikin America, Fluoroalkyl acrylate copolymer (based on perfluorohexanoic acid) and (2) C8: Flexipel FC242N, Innovative Chemical Technologies, Inc., Fluoroalkyl acrylate copolymer (based on perfluorooctanoic acid) on nylon 6 fibers. The results are summarized below.

1% owf PU-1/1% owf WR
Water repellency—2+ hours
Soiling—Excellent
Durability—Excellent through 10 hot water extractions
1.50% owf PU-2/0.50% owf ASA
Water repellency—2+ hours
Soiling—Excellent
Durability—Excellent through 10 hot water extractions
Typical C-6 Fluorocarbons (Applied at 500 ppm)
Water repellency—2+ hours
Soiling—Average
Durability—Excellent through 5 hot water extractions
Typical C-8 Fluorocarbons (Applied at 500 ppm)
Water repellency—4+ hours
Soiling—Average
Durability—Excellent through 5 hot water extractions In summary, the fibers contacted with PU-1 and PU-2 had enhanced soiling and durability properties compared to the same fibers contacted with the fluorinated compounds.

G. Evaluation of Nonfluorinated Polyurethanes (Industry Trial)

Nonfluorinated polyurethane PU-1 was applied topically onto solution-dyed nylon 6. The following parameters were used in the trial:
1. Application was on 20 oz. carpet
2. Line speed: 35 ft/min.
3. Coater length: 100 ft.
4. Coater temp: 300° F.
5. PU-1 and WR were applied at 8% wet pick up with direct foam injection
6. $1^{st}$ 100 ft. roll was applied with 1.60% owf PU-1 plus 0.50% owf WR
7. $2^{nd}$ 100 ft. roll was applied with 2% owf PU-1

The control in the study was a sample cut from the same fiber used in the trial treated with the standard fluorocarbon (C6) and stain blocker. Below are the results of the trial.
3M water repellent test
  2% PU-1: 28 min
  1.60% PU-1+0.50% WR: 120 min
  Control: 3 min. 40 sec.
Dupont Water Repellent Test
  2% PU-1: 3
  1.60% PU-1+0.50% WR: 4

Control: 1
Water repellency after 5 Hot Water Extractions (3M water repellent test)
  2% PU-1: Unchanged
  1.6% PU-1/0.5% WR: Unchanged
  Control: <5 seconds
Water repellency after 10 Hot Water Extractions (3M water repellent test)
  2% PU-1: 10 seconds
  1.6% PU-1/0.5% WR: 30 seconds
  Control: 0 seconds
Dupont Oil repellent Test
  2% PU-1: 1
  1.60% PU-1+0.50% WR: 3
  Control: 1
3M Oil Repellent test
  2% PU-1: 10 sec.
  1.60% PU-1+0.50% WR: 60 min
  Control: <10 sec.
AATCC accelerated soiling (evaluated from AATCC gray scale)
  2% PU-1: 4
  1.60% PU-1+0.50% WR: 4.50
  Control: 4.50
Red Dye 40 Stain
  2% PU-1: 9.5
  1.60% PU-1+0.50% WR: 9
  Control: 10
Lightfastness AATCC 16-3 (TSI)
  2% PU-1: 5.0
  1.6% PU-1/0.5% WR: 5.0
  Control: 4.5
NOX AATCC 164 (TSI)
  2% PU-1: 4.5
  1.6% PU-1/0.5% WR: 4.5
  Treated Control: 4.5
  Untreated Control: 4.5
Ozone
  2% PU-1: 4.5
  1.6% PU-1/0.5% WR: 5
  Treated Control: 5
  Untreated Control: 5

In summary, the nylon fibers contacted with PU-1 had superior water repellency compared to the control. Additionally, the presence of WR enhanced the oil repellency properties of the carpet without adversely affecting other carpet properties.

H. Evaluation of Polyurethanes Terminated with Water and Organic Alcohols

The water repellency of PU-1 (terminated with water) and carbamate-terminated nonfluorinated polyurethanes generated when the polymerization reaction was terminated with an alcohol was evaluated. The nonfluorinated polyurethanes were applied to nylon carpet fibers at 2% owf and the water repellency was evaluated using the 3M Water Repellency Test. Results of this test are presented in Table 3, where it is shown that the amine-terminated nonfluorinated polyurethane PU-1 (reaction terminated with water) exhibits superior water repellency properties when compared to carbamate-terminated nonfluorinated polyurethanes (i.e., reaction terminated with an organic alcohol).

TABLE 3

Water Repellency of Carbamate-Terminated Nonfluorinated Polyurethanes

| Termination Solvent | 3M Water Repellency | % Reduction in Water Repellency Compared to PU-1 |
|---|---|---|
| Water (PU-1) | >4 hours | — |
| Methanol | 4 minutes | 98% |
| Ethanol | 8 minutes | 96% |
| 2-Propanol | 30 minutes | 87.5% |
| Isobutanol | 11 minutes | 95% |

I. Evaluation of Polyurethanes Produced with Stoichiometric Amounts of Silicon Polyol, Polyisocyanate, and Organic Polyol The water repellency of a polyurethane produced from stoichiometric amounts of silicon polyol (0.92 molar ratio), isophorone diisocyanate (1.92 molar ratio), and dimethylolpropionic acid (0.92 molar ratio) ("the stoichiometric polyurethane") were compared to the water repellency of PU-1 (produced with isophorone diisocyanate at a molar ratio of 1.92 and silicon polyol at a molar ratio of 0.46). Below are the components and amounts used to make the stoichiometric polyurethane. The same to procedure used to make PU-1 was also used to produce the stoichiometric polyurethane evaluated in this study. The stoichiometric polyurethane produced from the amounts of components below results in a 1:1 molar ratio of NCO to OH groups.

Isophorone Diisocyanate 1.92 molar ratio
Silicone Diol (Silmer OH-Di 10) 0.92 molar ratio
Dimethylolpropionic acid 1.0 molar ratio
Triethylamine 0.99 molar ratio
Methylethyl ketone 17-18 weight %
Dibutyltindilaurate (DBTDL catalyst) 0.01 weight %
Water 75 weight %

The stoichiometric polyurethane was applied to nylon carpet fibers at 2% owf and the water repellency was evaluated using the 3M Water Repellency Test. PU-1 exhibited superior water repellency properties (4 hours) when compared to the stoichiometric polyurethane (2 hours). Additionally, the stoichiometric polyurethane is not stable, and separates into two distinct layers in less than 96 hours. Conversely, PU-1 can be stored for at least three months under the same conditions without phase separation.

Throughout this application, various publications are referenced. The disclosures of these publications in their entireties are hereby incorporated by reference into this application in order to more fully describe the compounds, compositions and methods described herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary

What is claimed:
1. A nonfluorinated polyurethane comprising (a) a plurality of siloxane units and (b) a plurality of organic polyoxy units, wherein at least one of the organic polyoxy units has an ionizable group, and wherein the ionizable group is a neutral group or a salt thereof, and wherein (1) a siloxane unit is linked to an organic polyoxy unit by a urethane group, wherein the siloxane unit has a molecular weight from 500 to

7,500; (2) the polyurethane comprises one or more terminal amino groups; and (3) the polyurethane comprises a plurality of urea groups, wherein the polyurethane is derived from a first polyisocyanate, a silicon polyol, and an organic polyol comprising an ionizable group, wherein the ionizable group is a neutral group or a salt thereof, wherein the ratio of the first polyisocyanate to silicon polyol is from is 2.085:1 to 4.5:1 and the ratio of the first polyisocyanate to organic polyol is from is 1.5:1 to 3.0:1, and wherein the reaction between the free first polyisocyanate and one or more isocyanate groups present on the polyurethane with water produces the one or more terminal amino groups and the plurality of urea groups.

2. The polyurethane of claim 1, wherein the siloxane unit has the formula I:

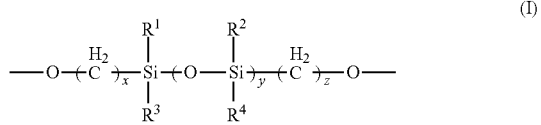

wherein x and z have a value of 0 to 10; y has a value of about 1 to 100, and $R^1$ to $R^4$ are, independently, selected from the group consisting of an alkyl group, a cycloalkyl group, or an aromatic group, and wherein the alkyl group, cycloalkyl group, or aromatic group can be substituted or unsubstituted.

3. The polyurethane of claim 2, wherein x and z are 3, and $R^1$ to $R^4$ are methyl.

4. The polyurethane of claim 1, wherein the siloxane unit has a molecular weight from 500 to 1,500.

5. The polyurethane of claim 1, wherein the ionizable group on the organic polyoxy unit is an anionic ionizable group, a cationic ionizable group, or a combination thereof.

6. The polyurethane of claim 1, wherein the ionizable group on the organic polyoxy unit is an anionic ionizable group, and the anionic ionizable group is a carboxyl group, a sulfonic acid group, a phosphoric acid group, or a salt thereof.

7. The polyurethane of claim 1, wherein the ionizable group on the organic polyoxy unit is a cationic ionizable group, and the cationic ionizable group is a substituted or unsubstituted amino group.

8. The polyurethane of claim 1, wherein the organic polyoxy unit has the formula II:

—O-A-O— (II)

wherein m is an alkyl group, cycloalkyl group, or aromatic group, wherein the alkyl group, cycloalkyl group, or aromatic group can be substituted or unsubstituted, and wherein A has at least one ionizable group.

9. The polyurethane of claim 1, wherein the organic polyoxy unit has the formula III:

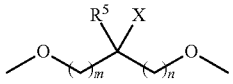

wherein m and n are, independently, from 0 to 10, $R^5$ is hydrogen or an alkyl group, and X is a carboxyl group.

10. The polyurethane of claim 9, wherein m and n are 1 and $R^5$ is hydrogen or methyl.

11. The polyurethane of claim 1, wherein the ionizable group is a carboxylate group.

12. The polyurethane of claim 1, wherein the amino groups are primary amines, secondary amines, aromatic amines, or a combination thereof.

13. The polyurethane of claim 12, wherein the amino groups are primary amines.

14. A composition comprising the nonfluorinated polyurethane of claim 1 and water, an organic solvent, or a combination thereof.

15. A method for imparting liquid repellency, stain resistance, bleach resistance, or any combination thereof to an article, comprising contacting the substrate with the nonfluorinated polyurethane of claim 1.

16. The method of claim 15, wherein the nonfluorinated polyurethane is applied topically to an article.

17. The method of claim 15, wherein the article is a textile, a paper product, or a building material.

18. The method of claim 17, wherein the textile is a rug, carpet, yarn, bedding, clothes, or curtains.

19. The method of claim 17, wherein the paper product is cardboard storage device or a food packaging device.

20. The method of claim 17, wherein the building material is a plasterboard, a hardwood, an engineered wood flooring, a plywood, a concrete, a mortar, tile, a fiber-blended cement board, a cement calcium silicate board, a slag cement perlite board, an ALC board, a siding board, an extruded board, a steel plate, a plastic plate, a shingle, bricks, stones, or grout.

21. An article comprising the nonfluorinated polyurethane of claim 1.

22. A paint comprising the nonfluorinated polyurethane of claim 1.

23. The polyurethane of claim 1, wherein the polyurethane has two terminal —NH$_2$ groups.

24. The article of claim 21, wherein the article is a textile, a paper product, or a building material.

25. The article of claim 24, wherein the textile is a rug, carpet, yarn, bedding, clothes, or curtains.

26. The article of claim 24, wherein the paper product is cardboard storage device or a food packaging device.

27. The article of claim 24, wherein the building material is a plasterboard, a hardwood, an engineered wood flooring, a plywood, a concrete, a mortar, tile, a fiber-blended cement board, a cement calcium silicate board, a slag cement perlite board, an ALC board, a siding board, an extruded board, a steel plate, a plastic plate, a shingle, bricks, stones, or grout.

* * * * *